US009852542B1

(12) United States Patent
Ogale

(10) Patent No.: US 9,852,542 B1
(45) Date of Patent: Dec. 26, 2017

(54) METHODS AND APPARATUS RELATED TO GEOREFERENCED POSE OF 3D MODELS

(71) Applicant: Google Inc., Mountain View, CA (US)

(72) Inventor: Abhijit Ogale, Mountain View, CA (US)

(73) Assignee: Google LLC, Mountain View, CA (US)

( * ) Notice: Subject to any disclaimer, the term of this patent is extended or adjusted under 35 U.S.C. 154(b) by 545 days.

(21) Appl. No.: 13/774,051

(22) Filed: Feb. 22, 2013

Related U.S. Application Data

(60) Provisional application No. 61/623,857, filed on Apr. 13, 2012.

(51) Int. Cl.
*G06T 17/00* (2006.01)
*G06T 17/10* (2006.01)

(52) U.S. Cl.
CPC .................... *G06T 17/10* (2013.01)

(58) Field of Classification Search
CPC .......... G06T 17/00; G06T 17/20; G06T 19/00
USPC ......................................................... 345/420
See application file for complete search history.

(56) References Cited

U.S. PATENT DOCUMENTS

| | | | | |
|---|---|---|---|---|
| 6,914,599 | B1* | 7/2005 | Rowe et al. | 345/420 |
| 8,400,548 | B2 | 3/2013 | Bilbrey et al. | |
| 2002/0180809 | A1* | 12/2002 | Light et al. | 345/852 |
| 2004/0247174 | A1* | 12/2004 | Lyons | G06F 3/04845 382/154 |
| 2005/0177350 | A1* | 8/2005 | Kishikawa | 703/1 |
| 2009/0110241 | A1* | 4/2009 | Takemoto et al. | 382/103 |
| 2010/0310182 | A1* | 12/2010 | Kroepfl | G06K 9/00624 382/216 |
| 2010/0321489 | A1* | 12/2010 | Chen | G01C 11/02 348/116 |

OTHER PUBLICATIONS

Luo, et al, "Geotagging in Multimedia and Computer Vision—A Survey", Multimed Tools Appl, 2011, vol. 51, pp. 187-211.
Szeliski, "Image Alignment and Stitching: A Tutorial", Technical Report MSR-TR-2004-92, Dec. 10, 2006, 89 pages.
Umeyama, "Least-Square Estimation of Transformation Parameters Between Two Point Patterns", IEEE Transactions on Pattern Analysis and Machine Intelligence, vol. 13, No. 4, Apr. 1991, pp. 376-380.

* cited by examiner

*Primary Examiner* — Barry Drennan
*Assistant Examiner* — Terrell Robinson
(74) *Attorney, Agent, or Firm* — Lerner, David, Littenberg, Krumholz & Mentlik, LLP

(57) ABSTRACT

In one general aspect, a method can include accessing, from a database, a plurality of user-specified planar indicators within a real-world space where the plurality of user-specified planar indicators can be associated with a plurality of images of an object and identifying planar locations for the plurality of images within the real-world space. The method can include accessing, from the database, a plurality of model planar indicators within a model space where the plurality of model planar indicators can be associated, during modeling of the object as a three-dimensional model within the model space, with a plurality of locations of a plurality of image capture devices associated with the plurality of images. The method can also include aligning, at a computing device, at least a portion of the plurality of model planar indicators with at least a portion of the plurality of user-specified planar indicators.

20 Claims, 10 Drawing Sheets

METHODS AND APPARATUS RELATED TO GEOREFERENCED POSE OF 3D MODELS

CROSS-REFERENCE TO RELATED APPLICATION

This application is a Nonprovisional of, and claims priority to, U.S. Patent Application No. 61/623,857, filed Apr. 13, 2012, entitled "METHODS AND APPARATUS RELATED TO GEOREFERENCED POSE OF 3D MODELS", which is incorporated by reference herein in its entirety.

TECHNICAL FIELD

This description relates to georeferenced pose of three-dimensional models.

BACKGROUND

Geo-tagging can include associating various types of geographic information to images captured by photographers (e.g., tourists, passers-by) of, for example, famous landmarks (e.g., buildings, statues, formations in nature), events, etc. Because the geographic information can be useful to, for example, social networking, map-makers, photographers, etc., geo-tagging is a growing trend in digital photography and photo sharing. For example, the geographic information associated with an image of a landmark captured by a photographer can be used to readily identify the location of the landmark. Because the images produced by photographers can include inaccurate geographic information associated by the photographers (or others) with the images, processing the images and associated geographic information for large scale image processing for, for example, links to social media, production of maps with landmarks, as well as three-dimensional (3D) augmented and immersive experiences can be difficult. Thus, a need exists for systems, methods, and apparatus to address the shortfalls of present technology and to provide other new and innovative features.

SUMMARY

In one general aspect, a computer-readable storage medium can be configured to store instructions that when executed cause a processor to perform a process. The process can include selecting a user-specified planar indicator from a plurality of user-specified planar indicators within a real-world space where the user-specified planar indicator is associated with an image of an object and identifies a planar location for the image within the real-world space. The process can include selecting a model planar indicator from a plurality of model planar indicators within a model space, where the model planar indicator is associated, during modeling of the object as a three-dimensional model within the model space, with a location of an image capture device that captured the image. The process can include calculating a parameter value within an equation based on the user-specified planar indicator and the model planar indicator, and can include determining whether transformation of the three-dimensional model within a plane of the real-world space satisfies a threshold condition. The transformation of the three-dimensional model can be based on the equation, the parameter value, at least a portion of the plurality of model planar indicators, and at least a portion of the plurality of user-specified planar indicators corresponding with the at least the portion of the plurality of model planar indicators.

In another general aspect, the apparatus can include a memory, an up-direction calculation processor configured to calculate, within a real-world coordinate space, an up-direction vector of a three-dimensional model of an object oriented within a model coordinate space, the three-dimensional model being produced based on a plurality of images captured using a plurality of image capture devices. The apparatus can include a planar transformation processor configured to calculate a planar transformation of the three-dimensional model of the object within the real-world coordinate space based on a subset of a plurality of image capture device planar indicators associated with the plurality of image capture devices. The image capture device planar indicators can be referenced within a plane of the model coordinate space. The apparatus can include an altitude calculation processor configured to calculate an altitude of the three-dimensional model of the object with respect to a representation of a ground surface within the real-world coordinate space, and can include a placement processor configured to store, in the memory, indicators of the up-direction vector, the planar transformation, and the altitude for placement of the three-dimensional model within the real-world coordinate space.

In yet another general aspect, a method can include accessing, from a database, a plurality of user-specified planar indicators within a real-world space where the plurality of user-specified planar indicators can be associated with a plurality of images of an object and identifying planar locations for the plurality of images within the real-world space. The method can include accessing, from the database, a plurality of model planar indicators within a model space where the plurality of model planar indicators can be associated, during modeling of the object as a three-dimensional model within the model space, with a plurality of locations of a plurality of image capture devices associated with the plurality of images. The method can also include aligning, at a computing device, at least a portion of the plurality of model planar indicators with at least a portion of the plurality of user-specified planar indicators, based on a mathematical model, to transform the three-dimensional model within a plane of the real-world space.

The details of one or more implementations are set forth in the accompanying drawings and the description below. Other features will be apparent from the description and drawings, and from the claims.

DETAILED DESCRIPTION

Figure 1:
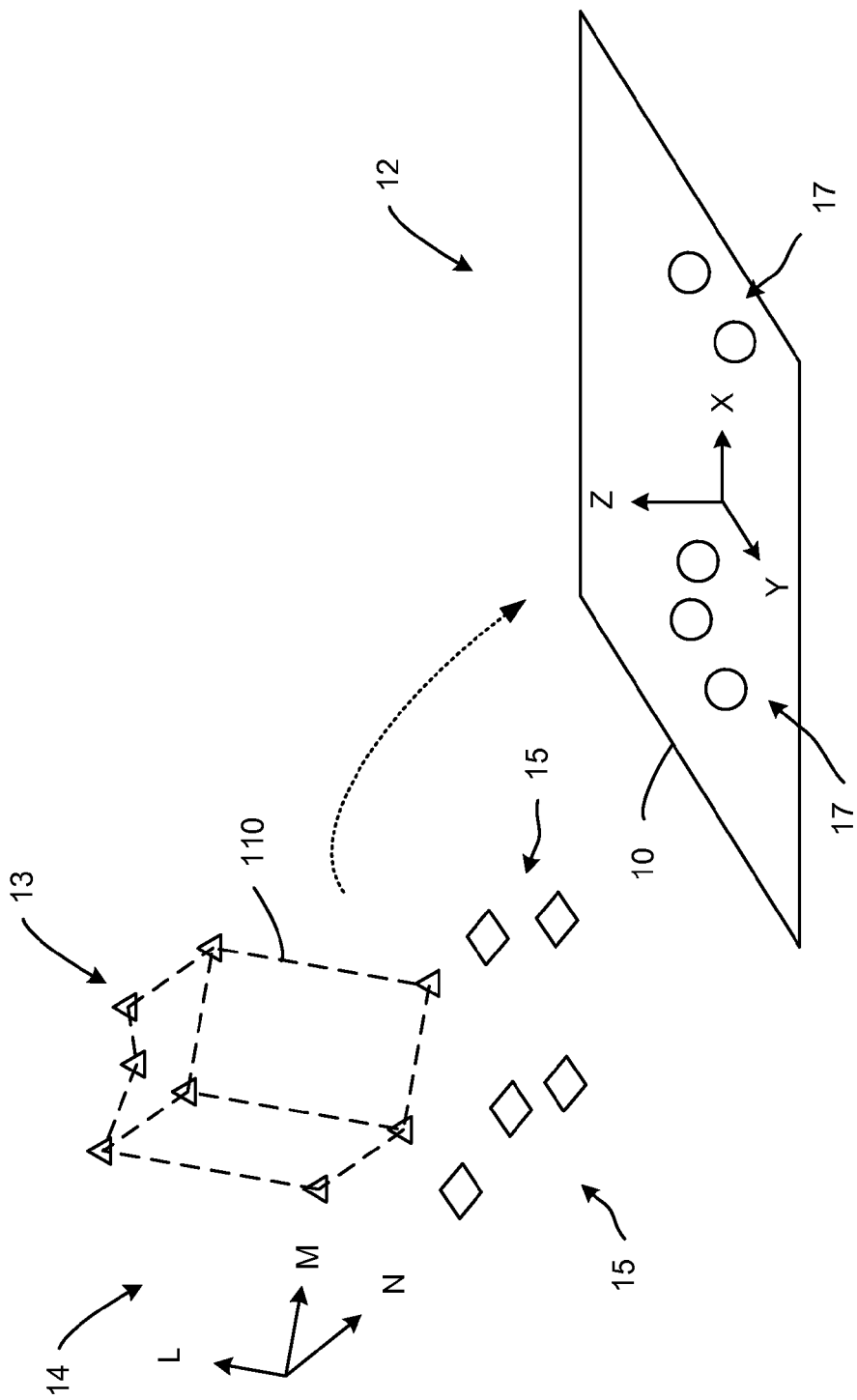
FIG. 1 is a diagram that illustrates placement, in a real-world space, of a three-dimensional (3D) model of an object referenced within a model space.

FIG. 1 is a diagram that illustrates placement, in a real-world space 12, of a three-dimensional (3D) model 110 of an object referenced within a model space 14. In this implementation, the model space 14 (also can be referred to as a model coordinate space) is a three-dimensional space with locations represented along coordinates L, M, and N, and the real-world space 12 is a three-dimensional space with locations represented along coordinates X, Y, and Z. In some implementations, the three-dimensional model 110 can represent a shape of the object within the model space 14. The model space 14 can be a space defined for referencing locations of portions of the three-dimensional model 110 of the object, and can be defined during modeling of the three-dimensional model 110 of the object. In some implementations, the coordinates within each of these spaces (i.e., the model space 14, the real-world space 12) can be referenced by coordinate values. In some implementations, the real-world space 12 can be a geographic coordinate space and referred to as a real-world coordinate space. In some implementations, the real-world space 12 can be an earth-centered, earth fixed (ECEF) geographic coordinate space.

In some implementations, the placement of the three-dimensional model 110 of the object in the real-world space 12 can be referred to as positioning of the three-dimensional model 110 of the object within the real-world space 12. In some implementations, processing performed to place the three-dimensional model 110 of the object in the real-world space 12 can be referred to as placement analysis or as placement processing.

As shown in FIG. 1, the three-dimensional model 110 of the object is represented by model datapoints 13 in the model space 14. The model datapoints 13 in the model space 14 are illustrated by open triangles in this implementation. Also, in this implementation, the model data points 13 are connected by dashed lines to illustrate the shape of the object.

In some implementations, the object represented by the three-dimensional model 110 can be a real-world object. In other words, the three-dimensional model 110 can represent a real-world object, or can be a virtual representation of the object. In some implementations, the object can be a building, a statue, a monument, a feature in nature (e.g., a mountain, a cliff, a lake), and/or so forth. In some implementations, the object can be a famous landmark such as the Eiffel Tower, the Arc de Triomphe, a pyramid in Giza, Egypt, the Taj Mahal, Mt. Fuji in Japan, and so forth.

In some implementations, the real-world space 12 can represent a portion of a real-world such as, for example, a portion of land within a specific country on the earth. In other words, the real-world space 12 is a virtual representation of a portion of a real world. The real-world space 12 can be a space defined for referencing locations of, for example, objects (e.g., representations of real-world object), or portions thereof. In some implementations, the coordinates within the real-world space 12 can be, or can include, coordinates that can be used to reference any location on the earth (e.g., global positioning coordinates) or another planet. At least some portions of the real-world space 12 can be referenced to a ground surface 10 represented in FIG. 1 as a plane.

The three-dimensional model 110 of the object can be placed in a particular scale (e.g., size, volume), position, orientation (e.g., planar orientation, rotational orientation), up-direction, and/or so forth, within the real-world space 12. For example, the three-dimensional model 110 of the object can be placed with a specified planar transformation (e.g., scale, location (e.g., with a specified X-Y location), and/or planar orientation) within the real-world space 12, placed with a specified altitude within the real-world space 12 (e.g., with a specified Z location), and/or placed with a specified up-direction within the real-world space 12. In some implementations, the up-direction can be referred to as a rotational direction, and the up-direction can be represented by an up-direction vector. The three-dimensional model 110 of the object (which can represent a real-world object) can be placed in the real-world space 12 (which can represent a portion of a real world such as earth) so that the placement of the three-dimensional model 110 of the object within the real-world space 12 can correspond with a location of the real-world object in the portion of the real world.

As a specific example, a three-dimensional model (e.g., the three-dimensional model 110) can be a three-dimensional model of a building, and a real-world space (e.g., the real-world space 12 represented by coordinates X, Y, and Z) can be associated with a portion (e.g., a neighborhood) of a city. In this example, a ground surface (e.g., the ground surface 10) can approximately represent a street level of the city. The three-dimensional model of the building can be placed within the portion of the city so that the building is oriented in an upright position within a corner of a city block of the city. Specifically, the placement of three-dimensional model of the building within the portion of the city can be a virtual representation corresponding with an actual existence of the actual building in the city block of the actual city.

In some implementations, the three-dimensional model 110 of the object can be placed in the real-world space 12 so that the three-dimensional model 110 of the object can be used (e.g., viewed, interacted with) within the real-world space 12. In other words, the three-dimensional model 110 of the object can be placed in the real-world space 12 so that the three-dimensional model 110 of the object can be virtually viewed within the real-world space 12. For example, the real-world space 12 can be included in a virtual map (e.g., global or earth map) that can be navigated using a computer system (e.g., a personal computer). In such implementations, a three-dimensional model of an object such as building can be viewed by a user within the virtual map when placed within the real-world space 12 using the computer system. The placement processing of the three-dimensional model 110 of the object within the real-world space 12 can be performed automatically after the three-dimensional model 110 of the object has been produced with little or no manual intervention by an entity producing the three-dimensional model 110 of the object.

In some implementations, the three-dimensional model 110 of the object can be produced using multiple images of the object captured using multiple different image capture devices. Points (e.g., features) within the multiple images can be matched and used to generate the three-dimensional model 110. In some implementations, one or more of the multiple images can be publicly available images (e.g., publicly available images posted to one or more websites or stored in one or more repositories). In some implementations, the multiple images can be captured during different time periods. In some implementations, images used to produce a three-dimensional model 110 can be selected (e.g., filtered) based on size, field of view, user identification associated with the images, and/or so forth. In some implementations, one or more images can be excluded from processing to produce the three-dimensional model 110 based on a user preference associated with the image(s).

During modeling of the three-dimensional model 110 of the object, the configuration (e.g., planar location) of the image capture devices, within the model space 14, are calculated (e.g., modeled, estimated) and represented by indicators associated with the image capture devices. Because the indicators of the image capture devices can be calculated during modeling, the indicators of the image capture devices can be referred to as model indicators. The model indicators of the image capture devices can be calculated based on characteristics of the multiple images used to produce the three-dimensional model 110 of the object including pose represented by translation and/or orientation, distortion (e.g., radial lens distortion), focal length, and/or so forth.

The model indicators can include planar locations of the image capture devices (within the M-N plane), which are represented in this implementation as model planar indicators 15 (represented as diamonds). The model indicators can also include up-direction indicators of one or more of the image capture devices, which are not shown in this implementation, and can be referred to as model up-direction indicators.

In some implementations, because the model planar indicators 15 are referenced within the model space 14, the model planar indicators 15 can be represented by coordinate values in the model space 14. Specifically, the model planar indicators 15 can, in some implementations, be represented by coordinates values within the M-N plane of the model space 14. Similarly, model up-direction indicators can be represented within the model space 14. In some implementations, the model up-direction indicators and/or the model planar indicators 15 can be represented within the model space 14 as vectors.

In some implementations, one or more of the model indicators associated with one or more of the image capture devices can be different than a user-specified indicator of the one or more image capture devices. For example, in some implementations, one or more of the model planar indicators 15 associated with one or more of the image capture devices can be different than a user-specified planar position of the image capture device(s). In this implementation, user-specified planar indicators 17 of image capture devices are represented by circles within the real-world space 12. For example, an image of the object captured by an image capture device can be specified by a user as being in a user-specified planar location (e.g., position) with respect to the object. During creation of the three-dimensional model 110 of the object, the image capture device can be modeled as being at a model planar location (as represented by one of the model planar indicators 15) different from the user-specified planar location within the real-world (as represented by one of the user-specified planar indicators 17).

In some implementations, because the user-specified planar indicators 17 are associated with the real-world space 12, the user-specified planar indicators 17 can be represented by coordinate values in the real-world space 12. Specifically, the user-specified planar indicators 17 can, in some implementations, be represented by coordinate values within the X-Y plane of the real-world space 12.

Placement of the three-dimensional model 110 of the object in the real-world space 12 can be performed, at least in part, based on use of the model indicators (e.g., the model planar indicators 15, model up-direction indicators) associated with image capture devices, user-specified indicators (e.g., user-specified planar indicators 17) associated with image capture devices, and/or the model datapoints 13 associated with the three-dimensional model 110 of the object. In other words, a placement processing or analysis related to the three-dimensional model 110 of the object in the real-world space 12 can be performed, at least in part, based on use of the model indicators, user-specified indicators, and/or the model datapoints 13.

For example, the three-dimensional model 110 of the object can be (1) placed with a specified planar location within the real-world space 12, (2) placed with a specified up-direction within the real-world space 12, and/or (3) placed with a specified altitude within the real-world space 12 based on use of the model indicators associated with image capture devices, user-specified indicators associated with the image capture devices, and/or the model datapoints 13 associated with the three-dimensional model 110 of the object. In some implementations, the scale of the three-dimensional model 110 of the object within the real-world space 12 can be calculated (e.g., estimated). In some implementations, the scale of the three-dimensional model 110 can correspond with a spatial size or volume of the three-dimensional model 110 within the real-world space 12. In some implementations, the placement of the three-dimensional model 110 of the object with respect to North can also be calculated (e.g., estimated).

Specifically, the three-dimensional model 110 of the object can be placed with a specified planar location within the real-world space 12 (e.g., with a specified X-Y location) based on a statistical comparison of several of the model planar indicators 15 with several corresponding user-specified planar indicators 17. The three-dimensional model 110 of the object can be placed with a specified up-direction within the real-world space 12 based on a statistical analysis involving several of the model up-direction indicators. The three-dimensional model 110 of the object can be placed with a specified altitude within the real-world space 12 based on a statistical analysis of the model datapoints 13 above a ground surface 10 within the real-world space 12.

In some implementations, the model space 14 can be based on a different coordinate system than the real-world space 12. In such implementations, coordinate values related to the model space 14 can be converted to those of the real-world space 12, and vice versa, during placement processing of the three-dimensional model 110 of the object.

Figure 2:
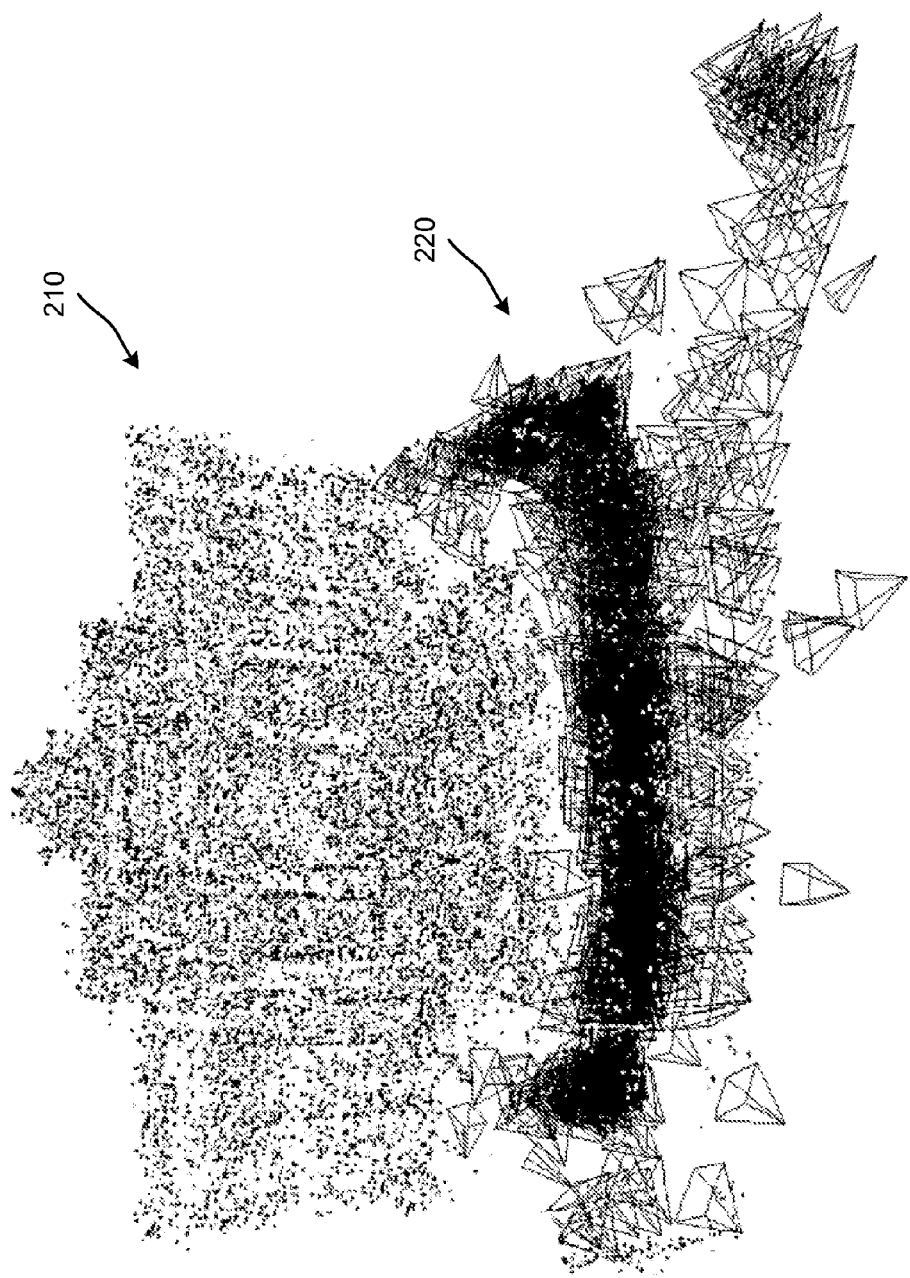
FIG. 2 is a diagram that illustrates a three-dimensional model of a building produced using multiple images captured by multiple image capture devices at locations illustrated by image capture device indicators.

FIG. 2 is a diagram that illustrates a three-dimensional model 210 of a building produced using multiple images captured by multiple image capture devices (e.g., cameras) at locations illustrated by image capture device indicators 220 (represented by pyramids in this implementation). Specifically, features included in the multiple images are processed (e.g., matched) and used to produce the three-dimensional model 210 of the building. The shape of the three-dimensional model 210 of the building is represented by model datapoints, which are shown as dots.

During modeling of the three-dimensional model 210 of the building, the locations of the image capture devices are calculated (e.g., modeled, estimated) and represented by model indicators 220 shown in FIG. 2. Because the indicators of the image capture devices can be calculated during modeling, the model indicators 220 (which can include up-direction indicators, planar indicators, etc.) can be referred to as model indicators 220. The model indicators 220 of the image capture devices can be calculated based on characteristics of the multiple images used to produce the three-dimensional model 210 of the building including, pose represented by translation and/or orientation, distortion (e.g., radial lens distortion), focal length, and/or so forth.

Figure 3:
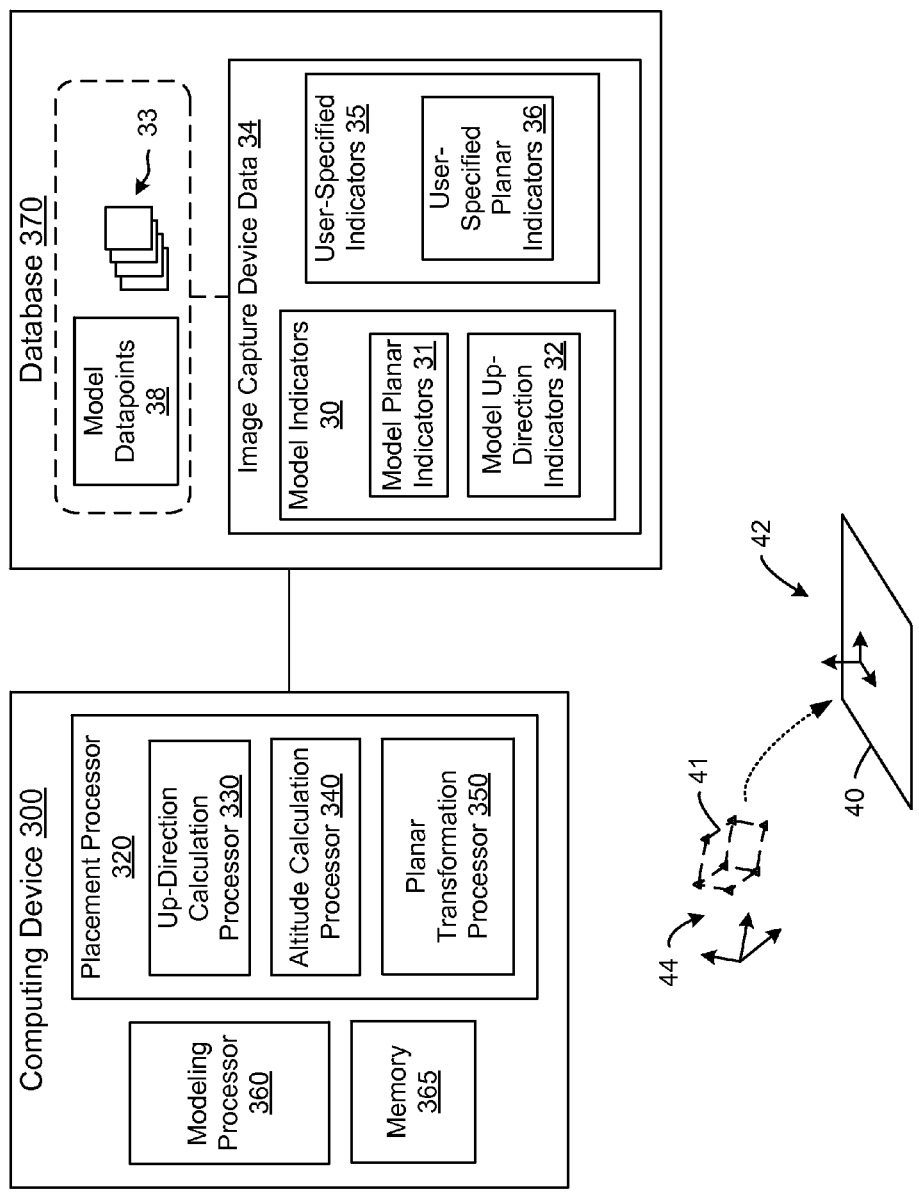
FIG. 3 is a diagram that illustrates a computing device including a placement processor and a modeling processor.

FIG. 3 is a diagram that illustrates a computing device 300 including a placement processor 320 and a modeling processor 360. The computing device 300 is configured to access (e.g., access data in) a database 370. The database 370 is configured to store data associated with processing performed by the computing device 300. Placement processor 320 can be configured to facilitate placement of a three-dimensional model 41 of an object oriented within the model space 44 in a real-world space 42 representing a portion of a physical environment. In other words, the placement processor 320 can be configured to perform placement processing.

Specifically, the placement processor 320 can be configured to place the three-dimensional model 41 of the object with a specified scale (e.g., size), planar orientation, or planar location (e.g., planar translation) within the real-world space 42, place the three-dimensional model 41 of the object with a specified up-direction within the real-world space 42, and/or place the three-dimensional model 41 of the object with a specified altitude within the real-world space 42. In some implementations, the placement processor 320 can be configured to store (e.g., store in a memory 365 (e.g., a local memory, a remote memory), store in the database 370) indicators of the up-direction vector, planar transformation (which can include a scale value, an orientation value, a translation value, and/or so forth), and/or altitude that can be used for later placement of the three-dimensional model 41 of the object within the real-world space 42 (or a representation thereof such as a three-dimensional map).

The modeling processor 360 is configured to define the three-dimensional model 41 of the object based on images 33 of the object. The three-dimensional model 41 of the object can be stored as model datapoints 38 oriented with the model space 44. The images 33 of the object can be captured by multiple image capture devices, and can be associated with image capture device data 34. Accordingly, each of the datapoints within the model datapoints 38 can also be associated with the image capture device data 34. In some implementations, the model datapoints 38 representing the three-dimensional model 41 of object can be produced by matching features within the images 33. In some implementations, one or more of the images 33 can be publicly available images (e.g., publicly available images posted to one or more websites or stored in one or more repositories).

As shown in FIG. 3, the image capture device data 34 includes model indicators 30 and user-specified indicators 35. The model indicators 30 can be defined when producing the three-dimensional model 41 of the object, and the user-specified indicators 35 can be defined when the images 33 of the object are captured.

The model indicators 30 can be referenced within the model space 44. Model indicators 30 include model planar indicators 31 and model up-direction indicators 32. In some implementations, the model indicators 30 can include altitude indicators.

The user specified indicators 35 can be oriented (e.g., referenced) within (or associated with) the real-world space 42. In this implementation, user-specified indicators 35 include user-specified planar indicators 36. In some implementations, the user-specified indicators 35 can include user-specified up-direction indicators (not shown) and/or user-specified altitude indicators (not shown). In some implementations, one or more of the user-specified indicators 35 can be defined after one or more of the images 33 are captured, but before the three-dimensional model 41 is produced.

Any combination of the model indicators 30 and the user-specified indicators 35 can be used to facilitate placement of the three-dimensional model 41 within the real-world space 42. In some implementations, one or more of the model indicators 30 and/or the user-specified indicators 35 can be eliminated from an analysis (e.g., the placement analysis) used to facilitate placement of the three-dimensional model 41 within the real-world space 42. Specifically, one or more of the model indicators 30 and/or the user-specified indicators 35 can be designated as outliers to be excluded from a placement analysis. Accordingly, in some implementations, only inliers can be used in a placement analysis. In some implementations, various types of deterministic algorithms, non-deterministic algorithms, and/or so forth can be used to eliminate outliers from a placement analysis. For example, a random sample consensus (RANSAC) methods can be used to estimate parameter values for placement of the three-dimensional model 41 using a mathematical placement model while eliminating (or excluding) at least some outliers. The outliers can be based on incorrect geo-tagged data or information.

Although not shown, in some implementations, the image capture device data 34 can include, date time stamps, resolution information, user identification information, and/or so forth that can be associated with one or more of the images 33 (and one or more of the model datapoints 38).

As shown in FIG. 3, the placement processor 320 includes an up-direction calculation processor 330. The up-direction calculation processor 330 is configured to calculate an up-direction of the three-dimensional model 41 (within the model space 44) with respect to the real-world space 42. The up-direction calculation processor 330 is configured to determine an up-direction of the three-dimensional model based on the model up-direction indicators 32. The model up-direction indicators 32 can include indicators of an up-direction of each of the image capture devices used to capture the images 33 to produce the model datapoints 38 of the three-dimensional model 41.

Specifically, the up-direction calculation processor 330 is configured to select an up-direction for the three-dimensional model 41 based on a candidate (or target) up-direction that satisfies a threshold condition (e.g., a probabilistic condition, a statistical condition). In some implementations, the threshold condition used to determine the up-direction of the three-dimensional model 41 can be referred to as an up-direction threshold condition. The up-direction threshold condition can be stored in and/or accessed from the memory 365 of the computing device 300 and/or at the database 370.

For example, a candidate up-direction for the three-dimensional model 41 can be defined and compared (e.g., compared for alignment) with the up-direction of each of the image captures devices as included in the model up-direction indicators 32. If the candidate up-direction satisfies an up-direction threshold condition based on the comparison, the candidate up-direction can be selected as the up-direction for the three-dimensional model 41. Multiple candidate up-directions can be iteratively compared with at least a subset of the model up-direction indicators 32 until the up-direction threshold condition is satisfied. The up-direction selected after iterative analysis can be stored and used for placement of the three-dimensional model 41 within the real-world space 42.

In some implementations, the model up-direction indicators 32 can represent a horizontal axis of each of the image capture devices used to capture images 33. In such implementations, the up-direction for the three-dimensional model 41 candidate up-directions can be selected using the following dot-product formula or mathematical model $up_{candidate} \cdot x_{image} = 0$, where $up_{candidate}$ is the vector of the candidate up-direction and $x_{image}$ is the vector of the horizontal axis or landscape axis of each of the image capture devices. The dot-product formula can be used to determine whether or not the candidate up-direction is orthogonal to the horizontal axis of each of the image capture devices. The dot-product formula is based on the assumption that the majority of pictures captured by image capture devices are aligned horizontally (or in a landscape mode rather than a portrait mode). If a threshold number (e.g., a threshold percentage, a majority) of the dot-products satisfy the dot-product formula, the candidate up-direction can be selected as the up-direction for the three-dimensional model 41.

Figure 4:
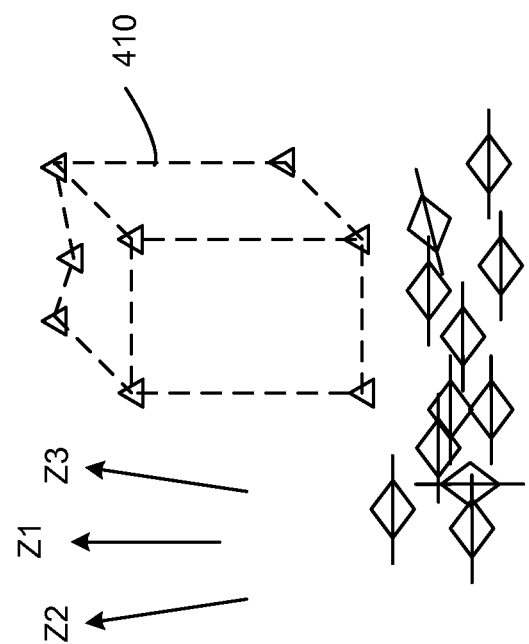
FIG. 4 illustrates an example up-direction calculation that can be performed by the up-direction calculation processor shown in FIG. 3.

FIG. 4 illustrates an example up-direction calculation that can be performed by the up-direction calculation processor 330 shown in FIG. 3. In this implementation, several candidate up-directions Z1 through Z3 can each be used in a dot-product formula (such as the dot product formula described above) to determine an up direction for the three-dimensional model 410. Image capture devices associated with images used to produce the three-dimensional model 410 are illustrated by diamonds, and the landscape axis of each of the image capture devices is illustrated by a line through diamonds. In this implementation, the candidate up-direction Z1 selected as the up direction for the three-dimensional model 410 because the majority of image capture devices have a landscape position that is orthogonal to the up-direction Z1. In some implementations, data (e.g., one or more landscape axis indicators) associated with one or more of the image capture devices can be excluded based on RANSAC techniques.

Referring back to FIG. 3, the placement processor 320 includes an altitude calculation processor 340. The altitude cancellation processor 340 is configured to determine an altitude of the three-dimensional model 41 with respect to a ground surface 40 (also can be referred to as a ground plane) associated with the real-world space 42 based on an altitude threshold condition. In some implementations, the altitude calculation processor 340 can be configured to place a specified portion (or percentage) of the three-dimensional model 41 above the ground surface 40 of the real-world space 42. Specifically, in some implementations, the altitude calculation processor 340 can be configured to place a specified number of model datapoints 38 associated with the three-dimensional model 41 above the ground surface 40 of the real-world space 42. The altitude threshold condition can be stored in and/or access from the memory 365 of the computing device 300 and/or at the database 370. The calculated altitude can be stored and used (e.g., as an altitude indicator) for placement of the three-dimensional model 41 within the real-world space 42.

Figure 5:
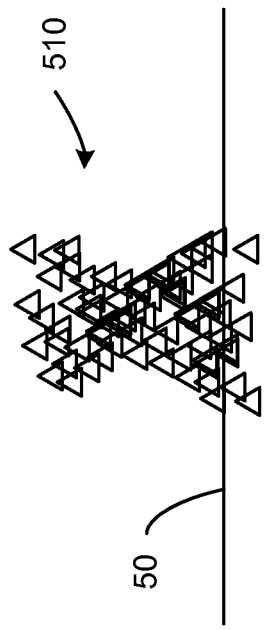
FIG. 5 illustrates an example altitude calculation performed by the altitude calculation processor shown in FIG. 3.

FIG. 5 illustrates an example altitude calculation performed by the altitude calculation processor 340 shown in FIG. 3. As shown in FIG. 5, a three-dimensional model 510 (including several model datapoints represented by open triangles) is placed by the altitude calculation processor 340 so that more than a specified percentage (e.g., more than 90%, more than 95%, more than 99%) of the three-dimensional model 510 is above a ground surface 50 associated with the real-world space. In some implementations, the altitude calculation processor 340 can be configured to place more than a specified number of features, model datapoints, height, and/or so forth above the ground surface 50.

Referring back to FIG. 3, the placement processor 320 includes a planar transformation processor 350. The planar transformation processor 350 can be configured to place the three-dimensional model 41 within a specified scale, planar location, and orientation (e.g., rotational orientation) within the plane of the ground surface 40. The planar transformation processor 350 can be configured to determine the planar transformation of the three-dimensional model 41 based on the combination of the model planar indicators 31 and the user-specified planar indicators 36.

Figure 6A:
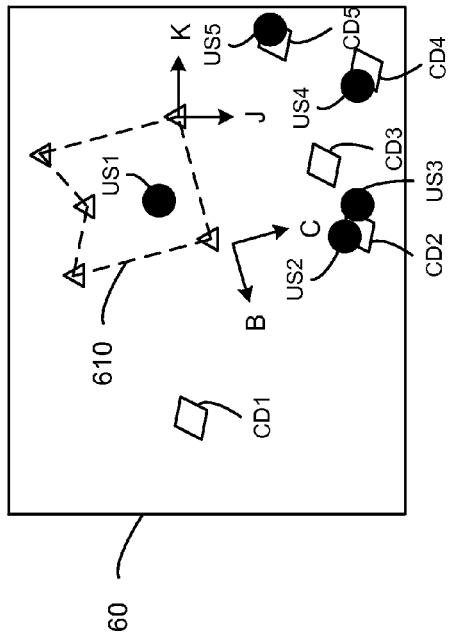
FIG. 6A through 6C illustrate an example of planar transformation performed by the planar transformation processor shown in FIG. 3.
Figure 6B:
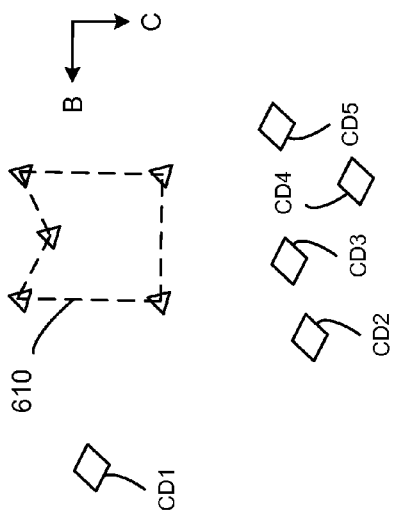
Figure 6C:
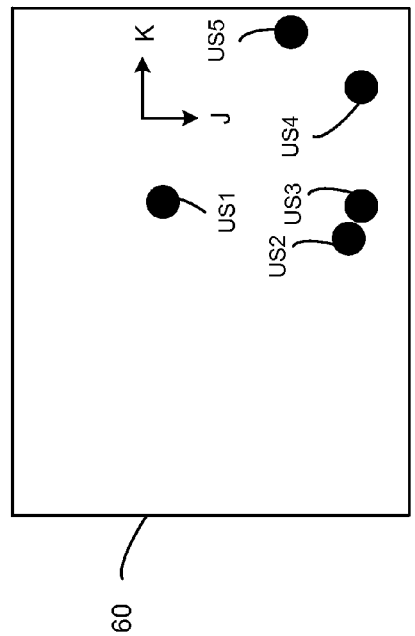

FIG. 6A through 6C illustrate an example of planar transformation performed by the planar transformation processor 350 shown in FIG. 3. As shown in FIG. 6C, the three-dimensional model 610, which is referenced to coordinate values along the B axis and C axis within a model coordinate space, is illustrated as being placed with a specified planar transformation within a real-world plane 60, which is referenced to coordinate values along the J axis and K axis within a real-world space. The three-dimensional model 610, shown in FIG. 6A, is produced using images captured by image capture devices represented with model planar indicators CD1 through CD5 (which are shown as diamonds). As shown in FIG. 6B, user-specified planar locations associated with the image capture devices are represented as user-specified planar indicators US1 through US5 (which are shown as black circles).

Referring back to FIG. 6C, the model planar indicators CD1 through CD5 are aligned with (e.g., matched with) one or more of the user-specified planar indicators US1 and US5. The three-dimensional model 610 is placed within the real-world plane 60 based on the fit (or alignment) between the model planar indicators CD1 through CD5 and the planar indicators US1 and US5. In this implementation, the planar location of model planar indicator CD2 approximately corresponds with the planar location of user-specified planar indicator US2, the planar location of model planar indicator CD4 approximately corresponds with the planar location of user-specified planar indicator US4, and the planar location of model planar indicator CD5 approximately corresponds with the planar location of user-specified planar indicator US5. Also, the planar location of model planar indicator CD1 does not correspond with (e.g., is offset from) the planar location of the user-specified planar indicator US1. Specifically, the user-specified planar indicator US1 is placed on top (or within) of the landmark, but the model planar indicator CD1 indicates that the image of the object was taken from the side of the object rather than from on top of (or within) the landmark. The planar location of model planar indicator CD3 roughly corresponds (e.g., is slightly offset from) with the planar location of user-specified planar indicator US3. The placement of the user-specified planar indicators US1 and US3 can be inaccurately placed indicators of planar locations (e.g., indicated in one or more geo-tags) by, for example, one or more photographers.

In some implementations, three-dimensional model 610 can be placed within the real-world plane 60 based on only a subset of the model planar indicators CD1 through CD5 matching with (e.g., being aligned with) the user-specified planar indicators US1 through US4. For example, because the correspondence between the model planar indicators CD1 and CD3, respectively, with user-specified planar indicators US1 and US3 is relatively poor, these planar indicators can be excluded from an analysis used to place a three-dimensional model 610 with the real-world plane 60. Accordingly, the model planar indicators CD1 and CD3 and the user-specified planar indicators US1 and US3 can be identified as (e.g., designated as) outliers to be excluded from (e.g., should be discarded from, should not be included in) an analysis used to place the three-dimensional model 610 within the real-world plane 60. In some implementations, one or more planar indicators (e.g., model planar indicators, user-specified planar indicators) can be eliminated from an analysis used to place a three-dimensional model based on a threshold distance, a statistical difference, and/or so forth. In some implementations, a RANSAC technique can be used to select planar indicators for use in placing the three-dimensional model 610 within the real-world plane 60.

In some implementations, the three-dimensional model 610 can be placed within the real-world plane 60 based on an iterative analysis including the planar locations of the user-specified planar indicators US1 through US5 (or a portion thereof) and the planar locations of the model planar indicators CD1 through CD5 (or a portion thereof). In some implementations, parameter values used to place the three-dimensional processor 610 via the model planar indicators can be calculated using an optimization algorithm such as, for example, a least-squares algorithm.

For example, a few (e.g., a pair, a triplet) of the user-specified planar indicators US1 through US5 corresponding with a few (e.g., a pair, a triplet) of the model planar indicators CD1 through CD5 can be used to calculate parameter values within an equation(s) or mathematical model(s) for placement. The equation(s) and calculated parameter values can then be used to place the model planar indicators CD1 through CD5 (or a portion thereof) within the real-world plane 60. If a statistical fit (or alignment) of the planar transformation of the model planar indicators CD1 through CD5 (or a portion thereof) within the real-world plane 60 with the user-specified planar indicators US1 and US5 (or a portion thereof) satisfies a planar threshold condition (also can be referred to as a transformation condition), the three-dimensional model 610 can be placed in the real-world plane 60 based on the planar transformation of the model planar indicators CD1 through CD5 (or a portion thereof) real-world plane 60 (using the equation and the calculated parameter values). If the statistical fit of the newly placed model planar indicators CD1 through CD5 (or a portion thereof) with the user-specified planar indicators US1 and US5 (or a portion thereof) does not satisfy the planar threshold condition, parameter values can be iteratively calculated (and prior parameter values discarded) until the planar threshold condition is satisfied. The planar threshold condition can be stored in and/or accessed from the memory 365 of the computing device 300 and/or at the database 370.

An example equation and methodology that can be used to calculate planar transformation of a three-dimensional model is described below. A pair of coordinate values of user-specified planar indicators corresponding with (or potentially corresponding with) coordinate values of model planar indicators associated with a three-dimensional model can be used to solve for values of orientation θ, scale S, translation value Tx, and translation value Ty (which can collectively be referred to as parameter values) using the following equations or mathematical model, which are based on local tangent coordinates:

$$X_{user\text{-}specified} = S \cdot (\cos(\theta) \cdot X_{model} - \sin(\theta) \cdot Y_{model}) + Tx, \text{ and}$$

$$Y_{user\text{-}specified} = S \cdot (\sin(\theta) \cdot X_{model} + \cos(\theta) \cdot Y_{model}) + Ty.$$

After simultaneously solving these equations, the values for orientation θ, scale S, translation value Tx, and translation value Ty can be used to place the model planar indicators (or a portion thereof) within the real-world plane. After the model planar indicators have been placed within the real-world plane, the statistical differences between the user-specified planar indicators and the newly placed model planar indicators can be calculated. If the statistical differences satisfy a planar threshold condition, the values for orientation θ, scale S, translation value Tx, and translation value Ty can be used to place the model planar indicators (or a portion thereof) within the real-world plane so that the three-dimensional model can be within the real-world plane.

As a specific example, user-specified planar indicator US2 can have coordinate values (K2, J2) and user-specified planar indicator US4 can have coordinate values (K4, J4). Model planar indicator CD2 can have coordinate values (B2, C2) and model planar indicator CD4 can have coordinate values (B4, C4). The coordinate values of the user-specified planar indicators US2 and US4 can be used in conjunction with coordinate values of the model planar indicators CD2 and CD4 to define the following equations or mathematical model:

$$K2_{user\text{-}specified} = S \cdot (\cos(\theta) \cdot B2_{model} - \sin(\theta) \cdot C2_{model}) + Tx,$$

$$J2_{user\text{-}specified} = S \cdot (\sin(\theta) \cdot B2_{model} + \cos(\theta) \cdot C2_{model}) + Ty,$$

$$K4_{user\text{-}specified} = S \cdot (\cos(\theta) \cdot B4_{model} - \sin(\theta) \cdot C4_{model}) + Tx, \text{ and}$$

$$J4_{user\text{-}specified} = S \cdot (\sin(\theta) \cdot B4_{model} + \cos(\theta) \cdot C4_{model}) + Ty.$$

These four equations can be used to solve for values for orientation θ, scale S, translation value Tx, and translation value Ty. The values for orientation θ, scale S, translation value Tx, and translation value Ty can be used to align all or at least a portion of user-specified planar indicators US1 through US5 with all or at least a portion of the model planar indicators CD1 through CD5. If the alignment satisfies a planar threshold condition, the values for orientation θ, scale S, translation value Tx, and translation value Ty can be used to place the three-dimensional model 610 in the real-world plane 60.

In some implementations, several different pairs (e.g., mutually exclusive pairs, randomly selected pairs) of the user-specified planar indicators US1 through US5 and model planar indicators CD1 through CD5 can iteratively be used to solve for the unknown values for orientation θ, scale S, translation value Tx, and translation value Ty until the user-specified planar indicators US1 through US5 (or a portion thereof) and model planar indicators CD1 through CD5 (or a portion thereof) are aligned in a desirable fashion (e.g., in accordance with a planar threshold condition).

As discussed briefly above, several criteria can be used to exclude one or more user-specified planar indicators and/or model planar indicators from a planar transformation calculation. Said differently, several criteria can be used to designate one or more one or more user-specified planar indicators and/or model planar indicators as outliers to be excluded from a planar transformation calculation. In some implementations, only a relatively small percentage (e.g., 10 percent, 5 percent, 20 percent) of available user-specified planar indicators may be selected for use (after user-specified planar indicators are excluded) in a planar transformation calculation. In some implementations, the pair of coordinate values of user-specified planar indicators used in the equations illustrated above must be separated by a threshold distance (e.g., separated by more than 10 m) to be used in calculating one or more of the parameter values. Similarly, in some implementations, the pair of coordinate values of model planar indicators must be separated by a threshold distance (e.g., separated by more than 10 m) to be used in calculating one or more of the parameter values.

In some implementations, user-specified planar indicators and corresponding model planar indicators can be excluded from use in planar transformation when the user-specified planar indicators are positioned on top of an object (e.g., a landmark). It can be assumed, for some implementations, that an image of an object may not be captured from directly on top of the object. Accordingly, user-specified planar indicators positioned on an object, and model planar indicators corresponding to the user-specified planar indicators, can be excluded from one or more planar transformation calculations (e.g., a planar transformation analysis). For example, the user-specified planar indicator US1 and the corresponding model planar indicator CD1 can be excluded from use in a planar transformation calculation. Specifically, the user-specified planar indicator US1 and the corresponding model planar indicator CD1 can be excluded from use in calculating one or more of the parameter values.

In some implementations, user-specified planar indicators that are clustered (within a threshold distance (e.g., a threshold area or region)) or are placed in the same (e.g., identical) location, although being associated with many different images, (and corresponding model planar indicators) can be excluded from use in planar transformation. It can be assumed, for some implementations, that multiple different images of an object may not be captured from the same location. Accordingly, user-specified planar indicators positioned in a cluster or at identical locations, and model planar indicators corresponding to the user-specified planar indicators, can be excluded from one or more planar transformation calculations (e.g., can be excluded from use in calculating one or more of the parameter values).

In some implementations, user-specified planar indicators that are clustered (within a threshold distance (e.g., a threshold area or region)) or are placed in the same (e.g., identical) location (e.g., by the same user or user account) can be de-emphasized in a planar transformation calculation. In other words, the weighting (or emphasis or ranking) of non-clustered user-specified planar indicators (and corresponding model planar indicators) can be greater than the weighting (or emphasis or ranking) of clustered or identically positioned user-specified planar indicators (and corresponding model planar indicators).

In some implementations, one or more user-specified planar indicators (and corresponding model planar indicators) with a specified (or threshold) spatial spread (e.g., spatial density) for a planar transformation calculation can be selected (e.g., selected as inliers). Accordingly, the user-specified planar indicators (and corresponding model planar indicators) used in a planar transformation calculation can have a specified spatial spread. In some implementations, for example, the user-specified planar indicators (and corresponding model planar indicators) used in a planar transformation calculation can be selected to have greater than a threshold spatial spread (or density). In some implementations, the spatial spread can be achieved using RANSAC techniques. In some implementations, parameter values calculated during one or more iterations of a transformation analysis can be ranked (e.g., rank-ordered) based on spatial spread. Planar transformation of the three-dimensional model 41 within the real-world space 42 can be based on a rank-ordering (e.g., the highest ranked) parameter values.

Referring back to FIG. 3, in some implementations, the computing device 300 can be, for example, a wired device and/or a wireless device (e.g., wi-fi enabled device) and can be, for example, a computing entity (e.g., a personal computing device), a server device (e.g., a web server), a mobile phone, a touchscreen device, a personal digital assistant (PDA), a laptop, a television including, or associated with, one or more processors, a tablet device, e-reader, and/or so forth. The computing device 300 and/or database 370 can be configured to operate based on one or more platforms (e.g., one or more similar or different platforms) that can include one or more types of hardware, software, firmware, operating systems, runtime libraries, and/or so forth.

The components (e.g., modules, processors) of the computing device 300 and/or the database 370 can be configured to operate based on one or more platforms (e.g., one or more similar or different platforms) that can include one or more types of hardware, software, firmware, operating systems, runtime libraries, and/or so forth. In some implementations, the components of the computing device 300 and/or the database 370 can be configured to operate within a cluster of devices (e.g., a server farm). In such an implementation, the functionality and processing of the components of the computing device 300 and/or the database 370 can be distributed to several devices of the cluster of devices.

In some implementations, the processors within the placement processor 320 can be configured to operate in any order. For example, processing performed by the up-direction calculation processor 330 can be performed before processing performed by the altitude calculation processor 340 and/or the planar transformation processor 350. Also, processing performed by the planar transformation processor 350 can be performed before processing performed by the altitude calculation processor 340. In some implementations, processing performed by the planar transformation processor 350 must be performed before processing performed by the altitude calculation processor 340. In some implementations, processing performed by the up-direction calculation processor 330 must be performed before processing performed by the altitude calculation processor 340.

The components of the computing device 300 and/or the components of the database 370 can be, or can include, any type of hardware and/or software configured to process attributes. In some implementations, one or more portions of the components shown in the components of the computing device 300 and/or the components of the database 370 in FIG. 3 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computing device 300 and/or the components of the database 370 can be, or can include, a software module configured for execution by at least one processor (not shown). In some implementations, the functionality of the components can be included in different modules and/or different components than those shown in FIG. 3.

In some implementations, one or more of the components of the computing device 300 and/or the components of the database 370 can be, or can include, processors configured to process instructions stored in a memory (e.g., memory 365). For example, the placement processor 320 (and/or a portion thereof) can be, or can include, a combination of a processor and a memory configured to execute instructions related to a process to implement one or more functions.

In some implementations, the database 370 can be a remote database, a local database, a distributed database, a relational database, a hierarchical database, and/or so forth. In some implementations, at least some portions of the database 370 can be stored in the memory 365 (e.g., a local memory) of the computing device 300. In some implementations, the database 370 can be, or can include, a memory shared by multiple devices such as computing device 300. In some implementations, the database 370 can be associated with a server device (not shown) within a network and configured to serve the components of the computing device 300.

Although not shown, in some implementations, the components of the computing device 300 and and/or the components of the database 370 can be configured to operate within, for example, a data center (e.g., a cloud computing environment), a computer system, one or more server/host devices, and/or so forth. In some implementations, the components of the computing device 300 and/or the components of the database 370 can be configured to operate within a network. Thus, the components of the computing device 300 and/or the components of the database 370 can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the memory 365 of the computing device 300 can be any type of memory such as a random-access memory, a disk drive memory, flash memory, and/or so forth. In some implementations, the memory 365 can be implemented as more than one memory component (e.g., more than one RAM component or disk drive memory) associated with the components of the computing device 300.

Figure 7:
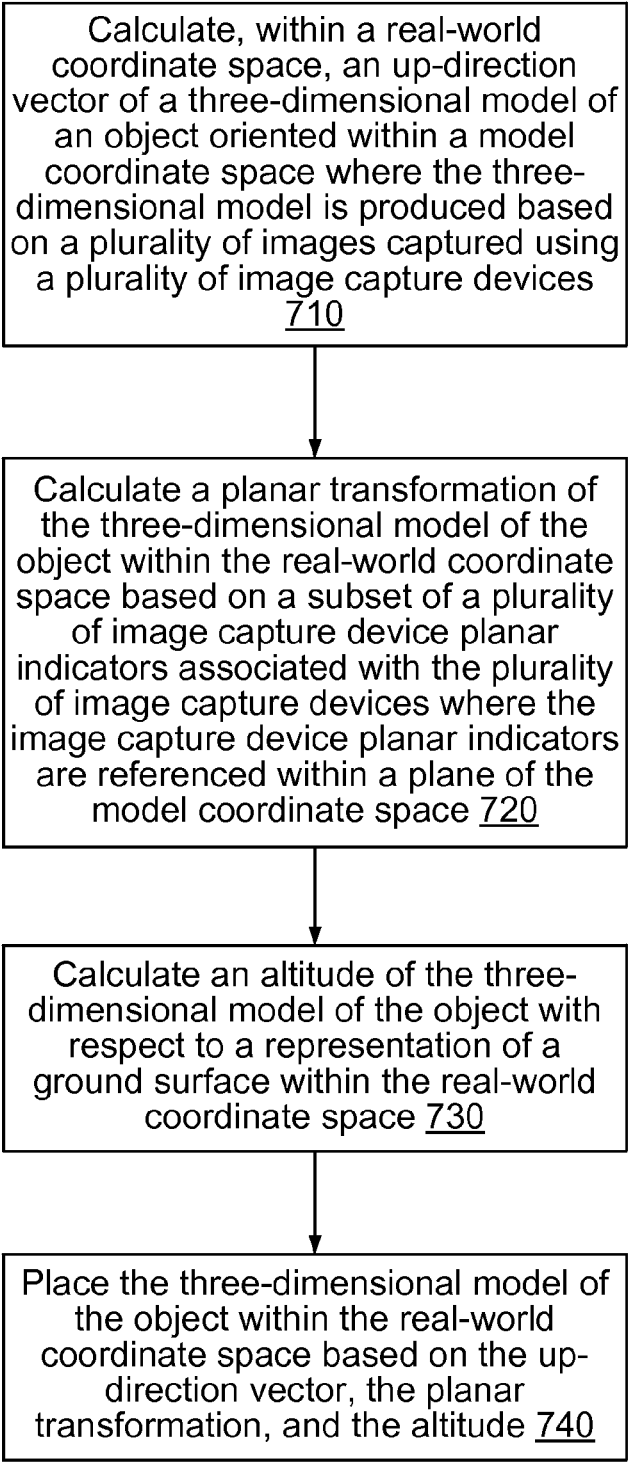
FIG. 7 is a flowchart that illustrates a method for placing a three-dimensional model within a real-world coordinate space.

FIG. 7 is a flowchart that illustrates a method for placing a three-dimensional model within a real-world space (also can be referred to as a real-world coordinate space). At least some portions of the method can be performed by the computing device 300 (e.g., the placement processor 320 of the computing device 300) shown in FIG. 3.

As shown in FIG. 7, an up-direction vector of a three-dimensional model of an object oriented within a model coordinate space can be calculated within a real-world coordinate space (block 710). The three-dimensional model can be produced based on a plurality of images captured using a plurality of image capture devices. In some implementations, the up-direction vector of the three-dimensional model of the object can be calculated by the up-direction calculation module 330 shown in FIG. 3. In some implementations, the up-direction vector of the three-dimensional model of the object can be calculated based on one or more up-direction threshold conditions. In some implementations, the real-world coordinate space can be associated with a map of a region of the globe. In some implementations, the model coordinate space can be used for referencing various features of the three-dimensional model of the object.

A planar transformation of the three-dimensional model of the object within the real-world coordinate space can be calculated based on a subset of a plurality of image capture device planar indicators associated with the plurality of image capture devices where the image capture device planar indicators are referenced within a plane of the model coordinate space (block 720). The planar transformation (which can include scale, orientation, and translation) of the three-dimensional model of the object within the real-world coordinate space can be calculated by the planar transformation processor 350 shown in FIG. 3. In some implementations, the planar transformation of the three-dimensional model of the object can be calculated based on one or more planar threshold conditions.

An altitude of the three-dimensional model of the object with respect to a representation of a ground surface within the real-world coordinate space can be calculated (block 730). The altitude of the three-dimensional model of the object with respect to the representation of the ground surface of the real-world coordinate space can be calculated by the altitude calculation processor 340 shown in FIG. 3. In some implementations, the altitude of the three-dimensional model of the object can be calculated based on one or more altitude threshold conditions.

The three-dimensional model of the object is placed within the real-world coordinate space based on the up-direction vector, the planar transformation, and the altitude (block 740). In some implementations, the three-dimensional model of the object can be placed within the real-world coordinate space for viewing by, for example, a user. In some implementations, indicators of the up-direction, planar orientation, and/or altitude can be stored for later placement of the three-dimensional model of the object within the real-world space (or a representation thereof such as a three-dimensional map).

Figure 8A:
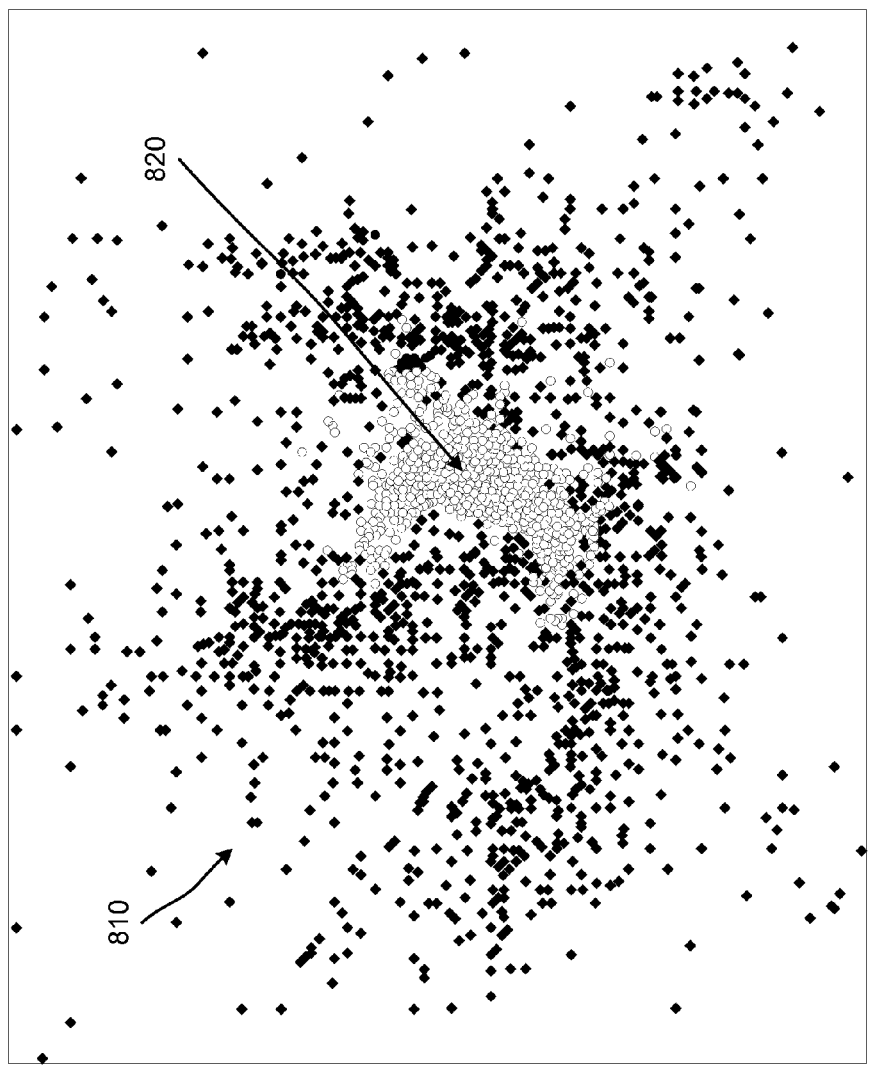
FIGS. 8A and 8B illustrate an example of changes to planar indicators during planar transformation performed by, for example, the planar transformation processor shown in FIG. 3.
Figure 8B:
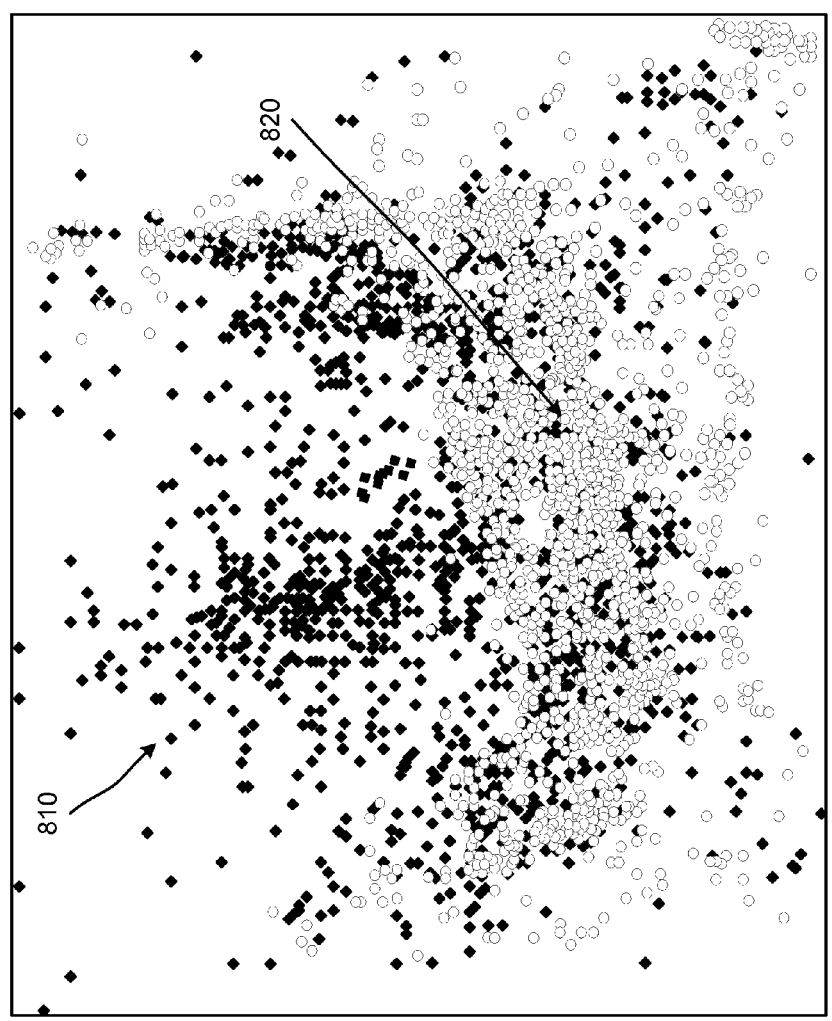

FIGS. 8A and 8B illustrate an example of changes to planar indicators during planar transformation (e.g., scaling, translation, orientation) performed by, for example, the planar transformation processor 350 shown in FIG. 3. FIG. 8A illustrates user-specified planar indicators 810 (shown as black diamonds) and model planar indicators 820 (shown as open circles) before alignment of the user-specified planar indicators 810 with the model planar indicators 820 during placement of a three-dimensional model (not shown). FIG. 8B illustrates the user-specified planar indicators 810 aligned with the model planar indicators 820 after alignment of the user-specified planar indicators 810 with the model planar indicators 820. As illustrated in FIGS. 8A and 8B, the transformation of the model, which includes orientation, scaling, and translation, is shown.

As shown in FIG. 8B, the model planar indicators 820 are generally rotated in a clockwise direction (from the orientation shown in FIG. 8A) with respect to the user-specified planar indicators 810. The orientation can be based on one or more parameter values (e.g., orientation value) calculated using a mathematical model to align the model planar indicators 820 (or portion thereof) with the user-specified planar indicators 810 (or portion thereof). The translation to a planar location can be based on one or more parameter values (e.g., translation values) calculated using a mathematical model to align the model planar indicators 820 (or portion thereof) with the user-specified planar indicators 810 (or portion thereof). Also, as shown in FIG. 8B, the spacing (or scale) between each of the model planar indicators 820 is generally increased from the spacing (or scale) between each of the model planar indicators 810 shown in FIG. 8A. The spacing can be based on one or more parameter values (e.g., a scale value) calculated using a mathematical model to align the model planar indicators 820 (or portion thereof) with the user-specified planar indicators 810 (or portion thereof).

Figure 9:
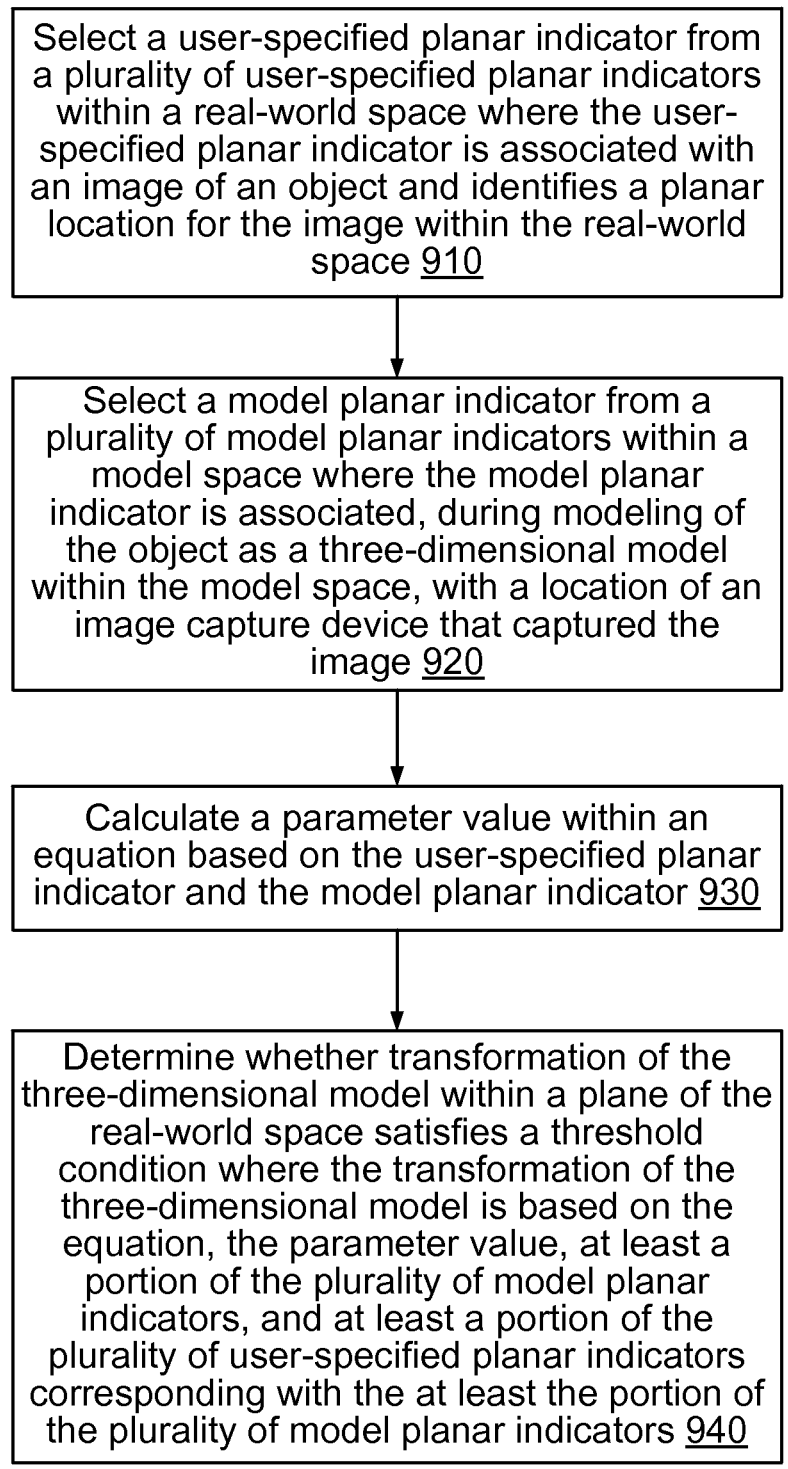
FIG. 9 is a flowchart that illustrates a method for calculating a planar transformation of a three-dimensional model of an object.

FIG. 9 is a flowchart that illustrates a method for calculating a planar transformation of a three-dimensional model of an object, according to an implementation. At least some portions of the method can be performed by the computing device 300 (e.g., the placement processor 320 of the computing device 300) shown in FIG. 3.

As shown in FIG. 9, a user-specified planar indicator is selected from a plurality of user-specified planar indicators within a real-world space where the user-specified planar indicator is associated with an image of an object and identifies a planar location for the image within the real-world space (block 910). The user-specified planar indicator can be selected by the planar transformation processor 350 shown in FIG. 3. In some implementations, the user-specified planer indicator can be a planar indicator specified by a user, an image capture device that captured the image of the object, and so forth. In some implementations, the user-specified planar indicators can include a global positioning system coordinate value.

A model planar indicator is selected from a plurality of model planar indicators within a model space where the model planar indicator is associated, during modeling of the object as a three-dimensional model within the model space, with a location of an image capture device that captured the image (block 920). In some implementations, the modeling of the object as the three-dimensional model within the model space can be performed by the modeling processor 360 shown in FIG. 3.

A parameter value is calculated within an equation based on the user-specified planar indicator and the model planar indicator (block 930). In some implementations, the parameter value can include a scale value, an orientation value, or a translation value. In some implementations, the parameter value can be calculated by the planar transformation processor 350 shown in FIG. 3. In some implementations, the equation can be based on local tangent coordinates. In some implementations, the equation can be similar to one or more of the equations described above in connection with FIGS. 6A and 6B. In some implementations, the parameter value can be calculated based on multiple user-specified planar indicators and multiple model planar indicators that each correspond with at least one of the multiple user-specified planar indicators.

As shown in FIG. 9, a determination as to whether transformation of the three-dimensional model within a plane of the real-world space satisfies a threshold condition is performed (block 940). The transformation of the three-dimensional model is based on the equation, the parameter value, at least a portion of the plurality of model planar indicators, and at least a portion of the plurality of user-specified planar indicators corresponding with the at least the portion of the plurality of model planar indicators. In some implementations, the threshold condition can be referred to as a planar threshold condition. In some implementations, the determination related to the threshold condition can be calculated by the planar transformation processor 350 shown in FIG. 3.

Figure 10:
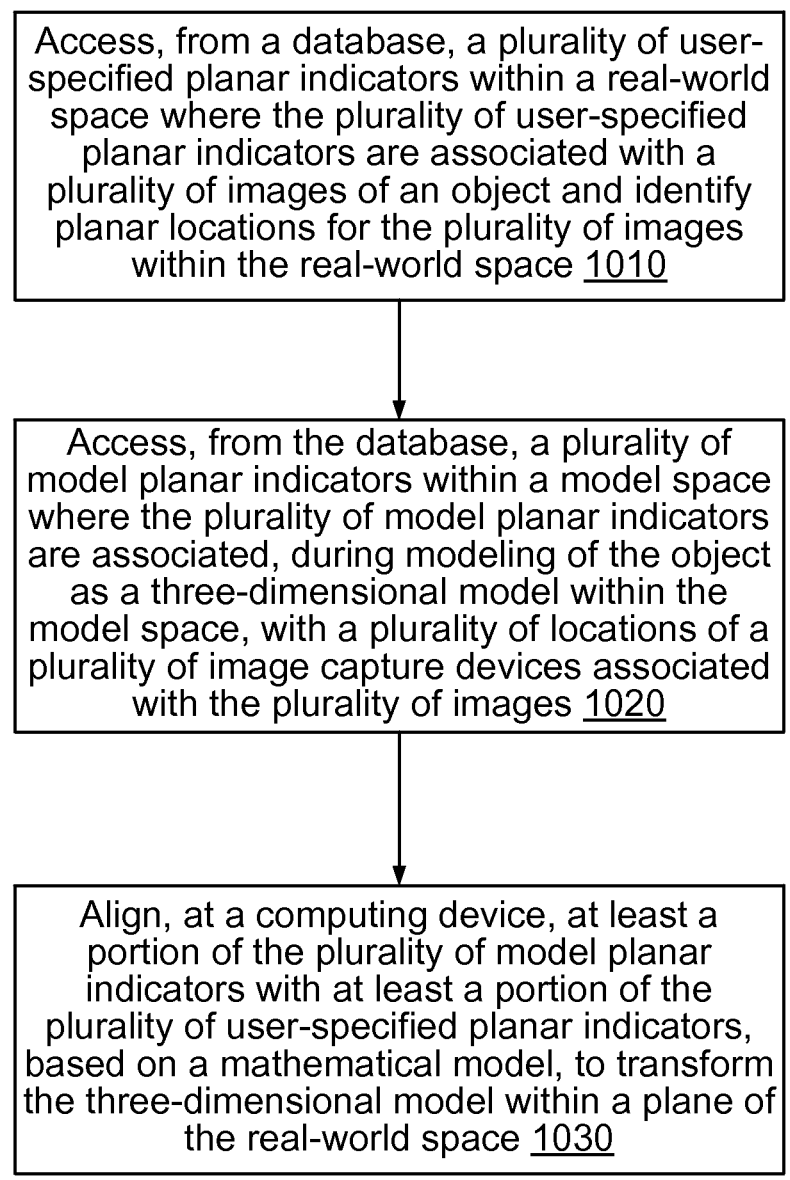
FIG. 10 is a flowchart that illustrates a method for placing a three-dimensional model of an object in a real-world space.

FIG. 10 is a flowchart that illustrates a method for placing a three-dimensional model of an object in a real-world space, according to an implementation. At least some portions of the method can be performed by the computing device 300 (e.g., the placement processor 320 of the computing device 300) shown in FIG. 3.

A plurality of user-specified planar indicators within a real-world space are accessed from a database where the plurality of user-specified planar indicators are associated with a plurality of images of an object and identify planar locations for the plurality of images within the real-world space (block 1010). In some implementations, the database can be a database 370 shown in FIG. 3.

A plurality of model planar indicators within a model space are accessed from the database where the plurality of model planar indicators are associated, during modeling of the object as a three-dimensional model within the model space, with a plurality of locations of a plurality of image capture devices associated with the plurality of images (block 1020).

At least a portion of the plurality of model planar indicators are aligned at a computing device with at least a portion of the plurality of user-specified planar indicators, based on a mathematical model, to place the three-dimensional model within a plane of the real-world space (block 1030). In some implementations, the computing device can be the computing device 300 shown in FIG. 3.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A process comprising:
    generating, with one or more processors, a three-dimensional model, relative to a model space, of an object in real-world space wherein the model is associated with a plurality of images of the object;
    determining, with the one or more processors, a plurality of model indicators, each model indicator being associated with an image of the object and a location from which the image was captured relative to a model space, where the location is determined based on one or more of the plurality of images;
    selecting, with the one or more processors, a model indicator from the plurality of model indicators;
    selecting, with the one or more processors, a user-specified indicator from a plurality of user-specified indicators, the user-specified indicator being associated with an image of the object and a user-specified location within the real-world space from which the image was captured;
    determining, with the one or more processors and based on an alignment of the selected model indicator and the selected user-specified indicator, an indicator of the altitude of the model in real-world space; and
    determining, with the one or more processors and based on the indicator of the altitude, the placement of the model in the real-world space relative to a ground plane associated with the ground surface of the real-world space.

2. The process of claim 1, further comprising determining whether transformation of the model relative to real-world space satisfies a threshold condition.

3. The process of claim 2, wherein the transformation includes at least one of an orientation, a scale, or a translation.

4. The process of claim 1, further comprising:
    accessing a plurality of image capture device up-direction indicators; and
    identifying an up-direction vector of the model of the object within the real-world space based on the plurality of image capture device up-direction indicators.

5. The process of claim 1, further comprising:
    designating a portion of the plurality of user-specified indicators as outliers; and
    discarding the portion of the plurality of user-specified indicators designated as outliers when determining the indicator of the altitude.

6. The process of claim 1, wherein the real-world space corresponds with a location on earth.

7. The process of claim 1, further comprising determining the indicator of the altitude based on an alignment of the plurality of model indicators and the plurality of user-specified indicators.

8. The process of claim 1, further comprising determining the scale of the model and orientation of the model within the real-world space.

9. The process of claim 1, wherein the selected user-specified indicator is based on global positioning system coordinates.

10. The process of claim 1, wherein the plurality of user-specified indicators are assigned to the image of the object by a user after the image of the object has been captured using the image capture device.

11. The process of claim 1, wherein the selected user-specified indicator includes a global positioning system coordinate value assigned to the image of the object by the image capture device.

12. A process comprising
    receiving a three-dimensional model, relative to a model space, of an object in a real-world space, wherein the three-dimensional model is associated with an image of the object;
    receiving a real-world capture location specified by a user or an image capture device, wherein the real-world capture location is associated with a real-world location from which the image was captured;
    determining, with one or more processors and based on characteristics of the image, a model-space capture location, wherein the model-space capture location is associated with the location from which the image was captured relative to the model space;

determining, with the one or more processors, an alignment of the model-space capture location and the real-world capture location;

determining, with the one or more processors and based on the alignment of the model-space capture location and the real-world capture location, one or more of a scale, location or orientation of the three-dimensional model relative to a real-world ground surface; and providing the three-dimensional model for display relative to the ground surface.

13. The process of claim 12 wherein determining one or more of a scale, location or orientation of the three-dimensional model relative to a real-world ground surface comprises determining one or more of the scale, location or orientation of the three-dimensional model relative to a plane approximately representing a street level in real-world space.

14. The process of claim 12 wherein the object is a building.

15. The process of claim 12 wherein the real-world capture locations is a global positioning system coordinate value.

16. A system comprising
one or more processors, and
memory storing instructions executable by the one or more processors,
wherein the instructions comprise:
receiving a three-dimensional model, relative to a model space, of an object in a real-world space, wherein the three-dimensional model is associated with an image of the object;
receiving a real-world capture location specified by a user or an image capture device, wherein the real-world capture location is associated with a real-world location from which the image was captured;

determining and based on characteristics of the image, a model-space capture location, wherein the model-space capture location is associated with the location from which the image was captured relative to the model space;

determining an alignment of the model-space capture location and the real-world capture location;

determining based on the alignment of the model-space capture location and the real-world capture location, one or more of a scale, location or orientation of the three-dimensional model relative to a real-world ground surface; and providing the three-dimensional model for display relative to the ground surface.

17. The system of claim 16 wherein determining one or more of the scale, location or orientation of the model relative to a real-world ground surface comprises determining one or more of the scale, location or orientation of the model relative to a plane approximately representing a street level in real-world space.

18. The system of claim 16 wherein the object is a building.

19. The system of claim 16 wherein one or more of the real-world capture locations was provided by an image capture device as a global positioning system coordinate value.

20. The system of claim 16 wherein the real-world capture locations and model-space locations are associated with an altitude.

* * * * *